United States Patent
Williams

[11] Patent Number: 5,855,025
[45] Date of Patent: Jan. 5, 1999

[54] TOILET FLUSH WATER SAVER

[76] Inventor: Jesse E. Williams, 21600 Everet Dr., California City, Calif. 93505

[21] Appl. No.: 779,704
[22] Filed: Jan. 7, 1997
[51] Int. Cl.⁶ ..................................................... E03D 1/00
[52] U.S. Cl. ..................................................... 4/353; 4/415
[58] Field of Search ............................... 4/324, 325, 353, 4/415, 378

[56] References Cited

U.S. PATENT DOCUMENTS

| | | | |
|---|---|---|---|
| 2,183,677 | 12/1939 | Heath | 4/353 |
| 4,017,914 | 4/1977 | Young, Sr. | 4/345 |
| 4,032,997 | 7/1977 | Phripp, et al. | 4/415 |
| 4,429,423 | 2/1984 | Syrenne | 4/225.1 |
| 4,449,259 | 5/1984 | Davies, et al. | 4/415 |
| 4,840,196 | 6/1989 | Antunez | 137/410 |
| 4,910,812 | 3/1990 | Comparetti | 4/325 |
| 4,980,932 | 1/1991 | Stemples | 4/415 |
| 5,287,565 | 2/1994 | Auman et al. | 4/415 |

*Primary Examiner*—Robert M. Fetsuga
*Attorney, Agent, or Firm*—Dennis W. Beech

[57] ABSTRACT

The toilet flush water saver is an attachment for the water inlet valve assembly of the toilet tank of a flush type toilet. The water saver is inserted in place of the tube that is normally routed from the water inlet valve assembly to the overflow pipe. A back pressure diverter tee conduit routes a portion of the refill water from the water inlet valve assembly into the overflow pipe and routes the remainder of the refill water into the toilet tank. A water saver tube is also directed at the flapper valve or ball valve to aid gravity in closing the flapper valve to seal the flush valve.

2 Claims, 2 Drawing Sheets

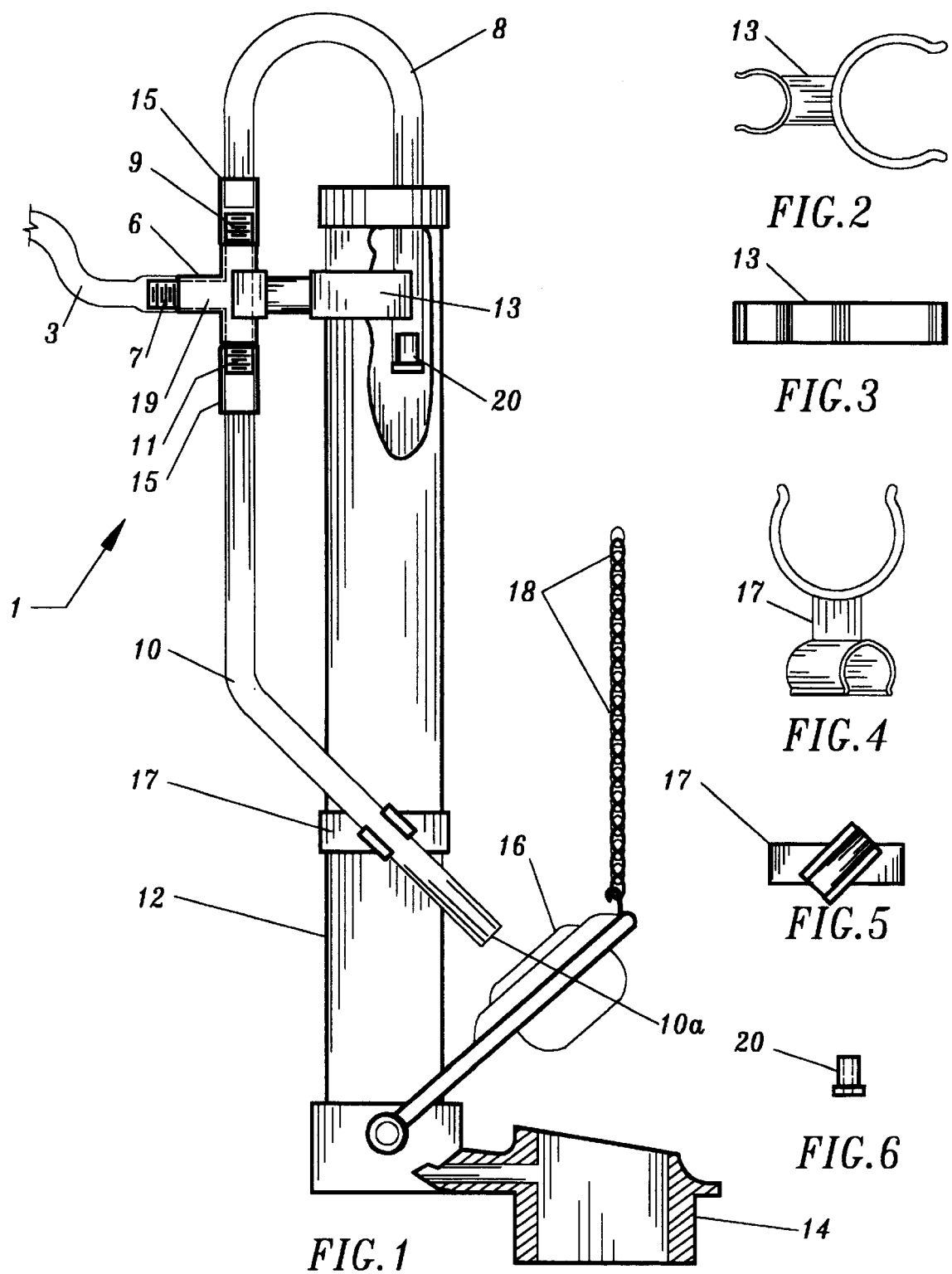

TOILET FLUSH WATER SAVER

BACKGROUND OF THE INVENTION

1. Field of the Invention

This invention relates to devices use to regulate the amount of water used by a toilet during the flushing operation. The new device provides a simple means to divert water from the overflow pipe into the toilet tank and to assure closure of the tank ball

2. Description of Related Art

There are currently in use various techniques to reduce the amount of water used by a toilet when flushed. The most basic device to reduce water usage is to make the toilet tank smaller. For already existing toilets this is often done by placing an object in the toilet tank of a desired volume such that the amount of water the toilet tank will hold is reduced.

Toilet tank ball valves in current use have not substantially changed in fifty (50) years. The refill port supplies 50% to 70% more water than necessary to fill the toilet bowl trap to proper levels.

Other simple methods to reduce water usage include placing a restriction type device in the overflow tube such that the amount of water leaving the toilet tank is metered. These simple systems often don't provide for entry of enough water into the toilet bowl to provide a proper flush or a proper level in the toilet bowl water trap.

Other more elaborate devices involving water containers in the toilet tank and in the water flow into the tank have been devised. Also multiple action toilet trip levers or multiple flush valve combinations have been disclosed. However, all such solutions tend to be overly complicated for the intended purpose of reducing water usage of the toilet.

The present invention provides a simple method to divert water from the overflow pipe into the toilet tank automatically, thereby conserving 50% to 70% of the water necessary to fill the toilet bowl to the proper level after flushing thus reducing the water going into the drain. This can conserve 1 to 3 quarts of water per flush. The water saver also directs refill water onto the flapper valve or tank ball to ensure the flush valve is closed properly to prevent excessive amounts of water use particularly in the case where a flapper valve might become stuck in the open position. This virtually eliminates continues flushing and vast amounts of wasted water, plus bowl overflow and possible residence flooding. The amount of diverted water can be regulated by the proper selection of water saver components including the diameter of tubes and the use of flow restricters depending on the type of toilet. The toilet water saver has no working parts and depends on the existing water supply system to operate, requiring little service or maintenance.

SUMMARY OF THE INVENTION

A primary objective of the present invention is to provide a means to regulate the amount of water used by a toilet during the flushing operation. Another object is to divert water during the flushing operation to aid in closing the flush valve flapper valve.

In accordance with the description presented herein, other objectives of this invention will become apparent when the description and drawings are reviewed.

BRIEF DESCRIPTION OF THE DRAWING

FIG. 1 illustrates a side elevation view of the water saver attached to a toilet tank overflow pipe.

FIG. 2 illustrates a top view of a standoff bracket.

FIG. 3 illustrates a side view of the standoff bracket.

FIG. 4 illustrates a top view of an angle standoff bracket.

FIG. 5 illustrates an end view of the angle standoff bracket.

FIG. 6 illustrates a side view of a flow restricter.

DESCRIPTION OF THE PREFERRED EMBODIMENT

The toilet flush water saver consists of a back pressure diverter tee conduit connected to a toilet tank water inlet valve assembly wherein the back pressure diverter tee conduit has one port connected to a refill tube and a second port connected to a water saver tube. The back pressure diverter tee conduit causes water flow to both the overflow pipe and the toilet tank. The water saver tube is mounted such that it directs pressurized water onto the open flapper ball valve of the flush valve.

Figure 7:
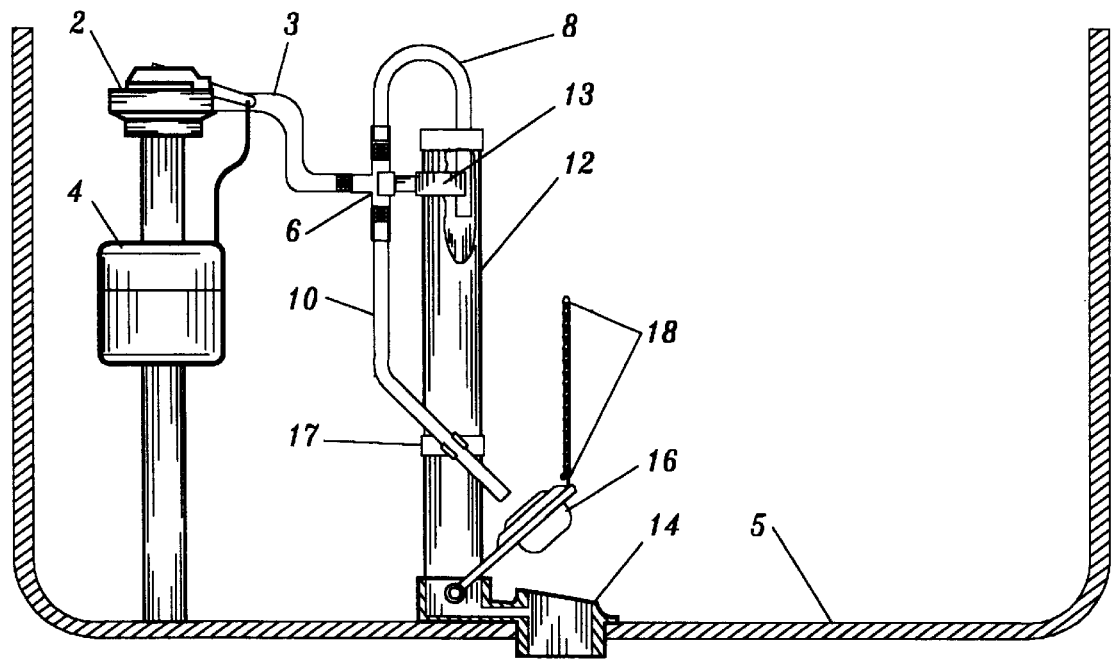
FIG. 7 illustrates a side view of the water saver mounted in a toilet tank.
Figure 8:
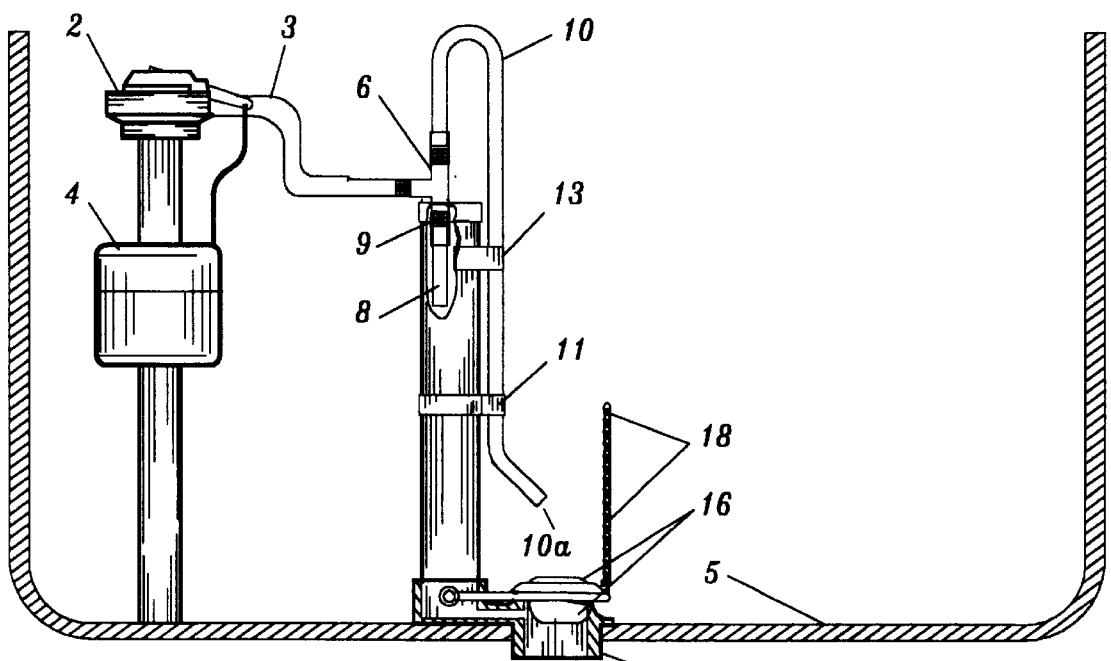
FIG. 8 illustrates a side view of another embodiment of the water saver mounted in a toilet tank.

Referring to FIGS. 1 through 8, the toilet flush water saver (1) is connected to the water inlet valve assembly (2) by inlet tube (3). The water inlet valve assembly (2) is attached to an outside pipe having a water pressure source. The float valve assembly (4) controls the closing of the water inlet valve assembly (2) at the selected toilet tank (5) water level.

The inlet tube (3) is connected to a back pressure diverter tee conduit (6) at the inlet port (7). The back pressure diverter tee conduit (6) is a three way joint as illustrated in FIG. 1 wherein the inlet port (7) is the tee joint center port. The back pressure diverter tee conduit (6) has a refill tube (8) connected to a refill port (9) and a water saver tube (10) connected to a saver port (11). Use of sleeve couplings (15) is illustrated to make the connections. The back pressure diverter tee conduit (6) is normally attached to the overflow pipe (12) of the toilet tank (5) by means of standoff bracket (13). The refill tube (8) is routed into the overflow pipe (12) to furnish the desired amount of water through the flush outlet (14) to the toilet bowl (not shown). The water saver tube (10) is routed to direct water into the toilet tank (5) automatically when the flapper ball closes. The water saver tube discharge end (10a) is routed to touch a flapper valve (16) when it is open. This provides additional water to fill the toilet tank (5) and to push the flapper valve (16) by hydraulic pressure closed rather than just relying on gravity. The water saver tube (10) is retained in position by an angle standoff bracket (17).

When the toilet trip lever (not shown) is activated to pull the trip lever chain (18) to lift the flapper valve (16), water escapes the toilet tank (5) into the toilet bowl (not shown) for flushing. The water inlet valve assembly (2) is opened and water flows through inlet tube (3). This refill water is diverted partially into the overflow pipe (12) and partially into the toilet tank (5) and against the open flapper valve (16). Once the flapper valve (16) closes the flush outlet (14), water to the overflow pipe (12) seals the toilet bowl water trap (not shown) and water to the toilet tank (5) adds to refill the toilet tank (5) with water from the water filling tube (not shown).

For operation with a 3½ gallon toilet tank (5), it has been found by experiment with a water pressure supply service of a minimum of 45 P.S.I. that using a back pressure diverter tee conduit (6) that diverts 50% of the refill water to refill port (9) and saver port (11) respectively provides enough water to seal the water trap. Typical inside diameters for the components are: the inlet tube 3/16 inches; inlet port, refill port and saver port 3/16 inches; and refill tube and water saver tube 3/16 inches. The internal chamber (19) of the back pressure diverter tee conduit (6) has been found to work best if the internal diameter is 9/32 inches.

For operation with larger toilet tanks (5) such as the common 5 gallon tank, the ratio of water diverted at the back pressure diverter tee conduit (6) should be change to provide more water proportionally to the toilet tank (5). This may be done by using all the same components as described above except with the addition of a refill tube flow restricter (20) in the outlet of the refill tube (8). If a refill tube flow restricter (20) having an inside diameter of 5/32 inches is inserted, 30% of the refill water enters the overflow pipe (12) and 70% of the refill water is diverted to the toilet tank (5).

The flapper valve (16) is illustrated as being approximately 45 degrees from horizontal when open. The water saver tube (10) is routed to direct water directly on to the flapper valve (16) at this 45 degree position.

Using a 45 degree angle has been found to slow the flow of escaping water thus producing less noise. Use of a firm, pliable water saver tube (10) provides the necessary structure for the discharge end (10a) to maintain the proper angle. The angle may vary between 30 the 50 degrees and yet achieve good results. The slower flow of escaping water also aids the toilet bowl in clearing as it floats solids out of the bowl eliminating a second flush. Fast escaping water often leaves solids in the bowl not giving solids long enough to float.

FIG. 9 shows the water saver (1) attached to the overflow pipe (12) with the back pressure diverter tee conduit (6) partially mounted in the overflow pipe (12). It is obvious that other mounting arrangements may also be used depending on the configuration of the particular toilet.

I claim:

1. A device for placement in a toilet tank of a flush toilet having an overflow pipe, a flush outlet and a water inlet valve assembly with an inlet tube connected thereto comprising:

a back pressure diverter tee conduit with an inlet port attachable to said inlet tube;

a refill tube connected at an end to a refill port of the back pressure diverter tee conduit and the refill tube at an opposite end insertable into said overflow pipe;

a water saver tube connected to a saver port of the back pressure diverter tee conduit;

a plurality of standoff brackets; and a flapper valve for opening and closing the flush outlet;

wherein the back pressure diverter tee and the water saver tube are attachable to said overflow pipe by the plurality of standoff brackets such that the water saver tube discharge end is directed at and touches the flapper valve when the flapper valve is opened at a 45 degree angle from horizontal.

2. The device as in claim 1 wherein the water saver tube discharge end is directed at the flapper valve at a 45 degree angle from horizontal.

* * * * *